(12) United States Patent
Li et al.

(10) Patent No.: US 10,201,775 B2
(45) Date of Patent: Feb. 12, 2019

(54) REGULATING FLOW OF PRESSURE SWING ADSORBERS

(71) Applicant: Nuvera Fuel Cells, LLC, Billerica, MA (US)

(72) Inventors: Zhijiang Li, Franklin, MA (US); Kyle Vanzandt, Allston, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 18 days.

(21) Appl. No.: 15/208,255

(22) Filed: Jul. 12, 2016

(65) Prior Publication Data

US 2017/0014748 A1 Jan. 19, 2017

Related U.S. Application Data

(60) Provisional application No. 62/191,802, filed on Jul. 13, 2015.

(51) Int. Cl.
*B01D 53/047* (2006.01)
*B01D 53/04* (2006.01)
*B01D 53/06* (2006.01)

(52) U.S. Cl.
CPC ....... *B01D 53/047* (2013.01); *B01D 53/0407* (2013.01); *B01D 53/0423* (2013.01);
(Continued)

(58) Field of Classification Search
CPC .............................. Y02C 10/08; B01D 53/0407; B01D 53/0423; B01D 53/0446; B01D 53/047;
(Continued)

(56) References Cited

U.S. PATENT DOCUMENTS 4,612,022 A * 9/1986 Berry .................... B01D 53/06
95/113
4,925,461 A * 5/1990 Gemba .............. B01D 53/0476
95/138

(Continued)

FOREIGN PATENT DOCUMENTS

GB 2 190 014 A 11/1987
WO WO 2001/041900 A2 6/2001

OTHER PUBLICATIONS

PCT Notification of Transmittal of the International Search Report and the Written Opinion of the International Searching Authority issued in International Application No. PCT/US2016/041880 dated Dec. 8, 2016.

(Continued)

*Primary Examiner* — Frank M Lawrence, Jr.
(74) *Attorney, Agent, or Firm* — Finnegan, Henderson, Farabow, Garrett & Dunner, LLP (57) ABSTRACT

A pressure swing adsorption (PSA) system for purifying a feed gas is provided. The PSA system may have a first adsorber bed and a second adsorber bed, each having a feed port, a product port, and adsorbent material designed to adsorb one or more impurities from the feed gas to produce a product gas. The PSA system may also have a first valve configured to direct flows of the feed gas and the product gas through a network of piping. The PSA system may further have a first orifice configured to regulate a flow rate of gas between the first adsorber bed and the second adsorber bed during the pressure equalization step and a second orifice configured to regulate a flow rate of gas between the first adsorber bed and the second adsorber bed during the purge step.

16 Claims, 9 Drawing Sheets

(52) U.S. Cl.
CPC ......... *B01D 53/0446* (2013.01); *B01D 53/06* (2013.01); *B01D 2253/102* (2013.01); *B01D 2253/104* (2013.01); *B01D 2253/106* (2013.01); *B01D 2253/108* (2013.01); *B01D 2256/16* (2013.01); *B01D 2257/502* (2013.01); *B01D 2257/504* (2013.01); *B01D 2257/80* (2013.01); *B01D 2259/402* (2013.01); *B01D 2259/403* (2013.01); *B01D 2259/404* (2013.01); *B01D 2259/40005* (2013.01); *B01D 2259/406* (2013.01); *B01D 2259/40035* (2013.01); *B01D 2259/40043* (2013.01); *B01D 2259/40083* (2013.01); *Y02C 10/08* (2013.01)

(58) Field of Classification Search
CPC ................ B01D 53/06; B01D 2256/16; B01D 2253/102; B01D 2253/104; B01D 2253/106; B01D 2253/108; B01D 2257/502; B01D 2257/504; B01D 2257/80; B01D 2259/40005; B01D 2259/40035; B01D 2259/40043; B01D 2259/40083; B01D 2259/402; B01D 2259/403; B01D 2259/404; B01D 2259/406
USPC ........ 95/96–98, 100, 103, 113; 96/121, 124, 96/125
See application file for complete search history.

(56) References Cited

U.S. PATENT DOCUMENTS

| | | | | |
|---|---|---|---|---|
| 5,258,056 | A * | 11/1993 | Shirley | B01D 53/047 95/138 |
| 5,301,439 | A * | 4/1994 | Wang | F26B 21/083 34/330 |
| 5,474,595 | A * | 12/1995 | McCombs | B01D 53/0415 95/130 |
| 5,820,656 | A * | 10/1998 | Lemcoff | B01D 53/0446 95/130 |
| 6,206,113 | B1 * | 3/2001 | Michael | C08K 7/08 175/71 |
| 7,445,663 | B1 | 11/2008 | Hunter et al. | |
| 2002/0029691 | A1 * | 3/2002 | McCombs | B01D 53/047 95/96 |
| 2006/0117957 | A1 * | 6/2006 | McCombs | A61M 16/10 96/121 |

OTHER PUBLICATIONS

PCT Invitation to Pay Additional Fees issued in International Application No. PCT/US2016/041880, dated Oct. 17, 2016.

* cited by examiner

REGULATING FLOW OF PRESSURE SWING ADSORBERS

This application claims the benefit of U.S. Provisional Application No. 62/191,802, filed Jul. 13, 2015, which is incorporated by reference in its entirety.

The present disclosure is directed towards regulating flow of pressure swing adsorbers, and more particularly, systems and methods of regulating flow of equalization and purge steps for pressure swing adsorbers.

Pressure swing adsorption (PSA) is a technology used to separate some gas fractions from a mixture of gases under pressure based on the fractions' molecular characteristics and affinity for an adsorbent material. The pressure swing adsorption separation process includes passing a gas flow containing impurity species through an adsorber bed at elevated pressures for a duration of time known as an adsorption time. Elevating the partial pressures of the impurities may cause the impurities to adsorb onto adsorbent materials within the adsorber bed. After the adsorption time has been reached, the adsorber bed may be depressurized and purged to remove the impurities and regeneration of the adsorbent materials can take place.

Pressure swing adsorption systems (PSAs) using at least two adsorber beds can be configured for near-continuous production of the product gas. In addition, the use of at least two adsorber beds permits an equalization step between the adsorber beds, where the gas leaving the adsorber bed being depressurized is used to partially pressurize the second adsorber bed. This equalization step can results in energy savings.

In traditional PSAs, variable flow resistance valves (e.g., needle valves) are used to adjust the gas flow rate between the adsorber beds during equalization. The variable flow resistance valves may be adjusted to avoid under-equalization (i.e., adsorber beds do not reach the ideal final pressure) and over-equalization (i.e., equalization takes place too quickly, which disrupts the distribution of gases in the adsorption bed). Variable flow resistance valves are also commonly used to control the gas flow rate during a purge step, where the product gas is used to blow desorbed impurities out of an adsorber bed. Excessive gas flow during the purge step can be a waste of the product gas and in some cases can cause contamination of the adsorber bed. Tuning of the variable flow resistance valves is commonly done during assembly and/or commissioning of the PSA system.

The use of variable flow resistance valves for controlling the gas flow rate during equalization and purge is less than optimal. The valves themselves increase the cost and complexity of PSA systems and the initial tuning required increases commissioning time and cost. Accordingly, the present disclosure is directed to overcoming one or more of the problems set forth above.

In one aspect, the present disclosure is directed to a pressure swing adsorption (PSA) system for purifying a feed gas. The PSA system may include a first adsorber bed and a second adsorber bed, each having a feed port, a product port, and an adsorbent material designed to adsorb one or more impurities from the feed gas to produce a product gas. The PSA system may also include a network of piping configured to direct the feed gas to the feed ports of the adsorber beds. The network of piping may also be configured to direct the product gas to and from the product ports of the adsorber beds. The network of piping may further be configured to transfer gas between the first adsorber bed and the second adsorber bed during a pressure equalization step and a purge step. The PSA system may also include a first valve configured to direct flows of the feed gas and the product gas through the network of piping. The PSA system may further include a first orifice configured to regulate a flow rate of gas between the first adsorber bed and the second adsorber bed during at least one of the pressure equalization step and the purge step.

In another aspect, the present disclosure is directed to a pressure swing adsorption (PSA) system for purifying a feed gas. The PSA system may include a first adsorber bed and a second adsorber bed, each having a feed port, a product port, and an adsorbent material designed to adsorb one or more impurities from the feed gas to produce a product gas. The PSA system may also include a network of piping configured to direct the feed gas to the feed ports of the adsorber beds and direct the product gas to and from the product ports of the adsorber beds. The network of piping may also be configured to transfer gas between the first adsorber bed and the second adsorber bed during an equalization step and a purge step. The PSA system may also include a first valve configured to control flow of the feed gas flow and the product gas flow through the network of piping. The PSA system may further include a second valve configured to direct flows of the feed gas flow and the product gas flow through the network of piping. The PSA system may also include a first orifice configured to regulate a flow rate of gas between the first adsorber bed and the second adsorber bed during at least one of the equalization step and the purge step.

In another aspect, the present disclosure is directed to a method of operating a pressure swing adsorption system for purifying a feed gas flow, having a first adsorber bed and a second adsorber bed. The method may include operating at least one of the first adsorber bed and the second adsorber bed in an adsorption mode. The method may also include operating at least one of the first adsorber bed and the second adsorber bed in a regeneration mode. The method may further include transferring a gas between the first adsorber bed and the second adsorber bed during an equalization step, wherein a flow rate of the gas is regulated via a first orifice.

In another aspect, the present disclosure is directed to a method of operating a pressure swing adsorption system for purifying a feed gas flow, having a first adsorber bed and a second adsorber bed. The method may include operating at least one of the first adsorber bed and the second adsorber bed in an adsorption mode. The method may also include operating at least one of the first adsorber bed and the second adsorber bed in a regeneration mode. The method may further include transferring a gas between the first adsorber bed and the second adsorber bed during a purge step, wherein a flow rate of the gas is regulated via an orifice.

It is to be understood that both the foregoing general description and the following detailed description are exemplary and explanatory only and are not restrictive of the present disclosure as claimed.

The accompanying drawings, which are incorporated in and constitute a part of this specification, illustrate several embodiments of the present disclosure and together with the description, serve to explain the principles of the present disclosure.

While the present disclosure is described herein with reference to illustrative embodiments of a pressure swing adsorption based purification device for hydrogen gas purification, it is understood that the systems and methods of the present disclosure may be employed with various types of pressure swing adsorption applications. Furthermore, while the present disclosure is primarily described herein with reference to illustrative embodiments of pressure swing adsorption systems having two adsorber beds, it is understood that the systems and methods of the present disclosure may be employed with pressure swing adsorption systems having more than two adsorber beds (e.g., 3, 4, 5, 6, 7, 8, 9, 10, or more). Those having ordinary skill in the art and access to the teachings provided herein will recognize additional modifications, applications, embodiments, and substitution of equivalents that all fall within the scope of the disclosure. Accordingly, the disclosure is not to be considered as limited by the foregoing or following descriptions.

Other features and advantages and potential uses of the present disclosure will become apparent to someone skilled in the art from the following description of the disclosure, which refers to the accompanying drawings.

Figure 1:
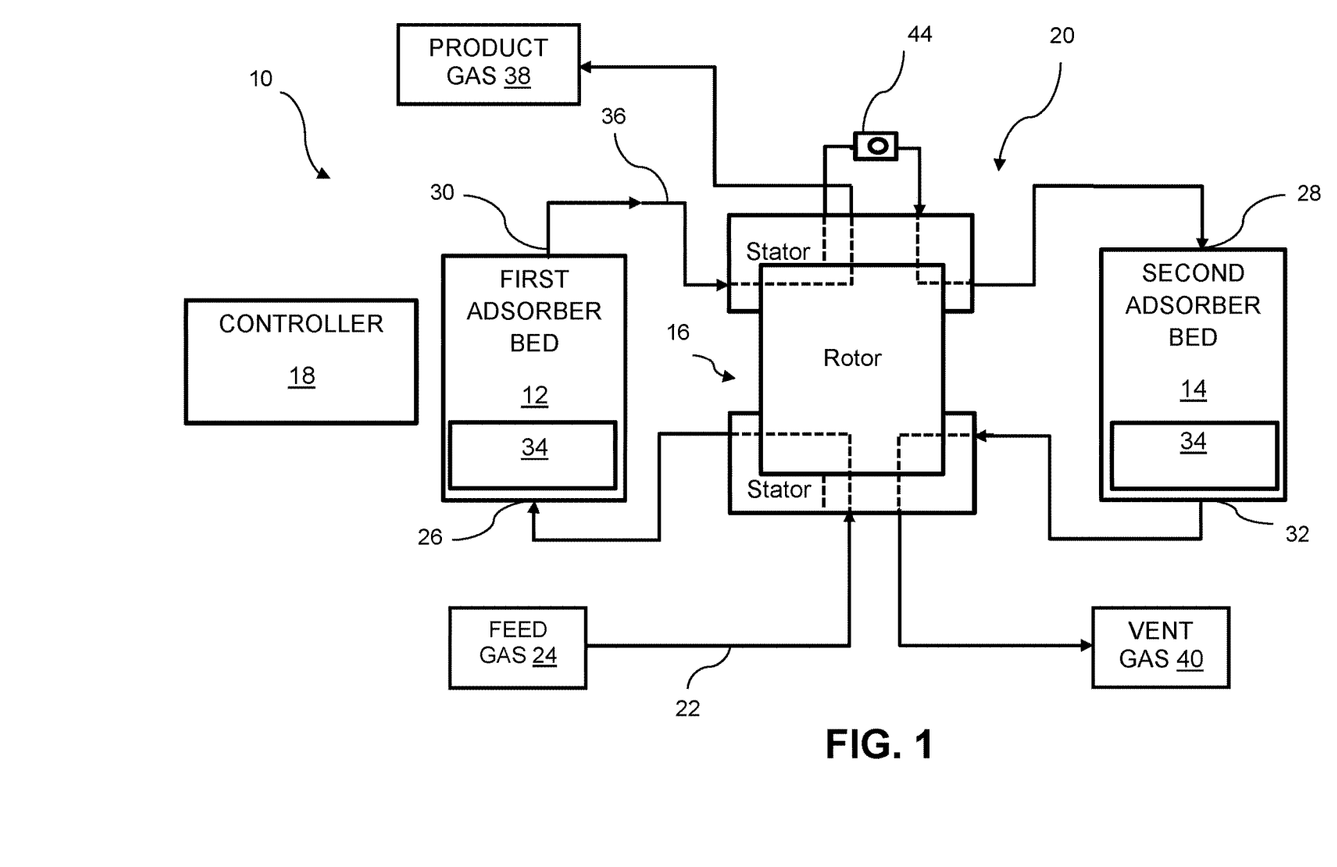
FIG. 1 is a flow schematic of an exemplary pressure swing adsorption (PSA) system having stationary PSA beds, wherein a first adsorber bed is configured for adsorption mode and a second adsorber bed is configured for regeneration mode.

FIG. 1 depicts a flow schematic of a pressure swing adsorption (PSA) system 10, according to an exemplary embodiment. PSA system 10 may include, among other things, a first adsorber bed 12, a second adsorber bed 14, a first valve assembly 16 having a plurality of connections, a controller 18 that may be in communication with first valve assembly 16, and a network of piping 20 configured to interconnect first adsorber bed 12, second adsorber bed 14, and first valve assembly 16. PSA system 10 may also include a plurality of transmitters, switches, and other valves (not shown) that may be in communication with controller 18. In some embodiments, the beds (i.e., first adsorber bed 12 and second absorber bed 14) may be stationary.

As shown in FIG. 1, the network of piping 20 may include an inlet pipe 22 configured to supply a feed gas 24 to first valve assembly 16. Depending on the positioned of first valve assembly 16, feed gas 24 may be routed to first feed port 26 of first adsorber bed 12 and/or second feed port 28 of second adsorber bed 14. First adsorber bed 12 and second adsorber bed 14 may also have a first product port 30 and a second product port 32, as shown in FIG. 1. First product port 30 and second product port 32 may be in fluid communication with first valve assembly 16. In some embodiments, first product port 30 and second product port 32 may also be in fluid communication with other valves or connections (not shown), for example, a vent to atmosphere.

First valve assembly 16 may be, for example, a multiport rotary valve. First valve assembly 16 may include one or more rotors and stators, each having multiple internal passages and/or ports that are aligned in different positions as the rotor turns to direct gas flow. The rotor and stator may have highly-polished surfaces between which continuous sliding contact is made to form a leak-tight gas seal. The position of first valve assembly 16 may be controlled by controller 18.

PSA system 10 may be configured to operate at generally constant temperature and may use the effect of alternating pressure and partial pressure to alternate first adsorber bed 12 and second adsorber bed 14 between an adsorption mode 200 and a regeneration mode 300. Feed gas 24 may be one or more various types of gases, for example, hydrogen gas, which may include impurities (e.g., water vapor, carbon dioxide, carbon monoxide, or other impurities).

PSA system 10 and first valve assembly 16 may be configured to route feed gas 24 to first feed port 26 when first adsorber bed 12 is operating in adsorption mode 200. Feed gas 24 may establish a pressure gradient across first adsorber bed 12 in, for example, an upward direction from first feed port 26 to first product port 30. The pressure may be determined by the pressure of feed gas 24.

First adsorber bed 12 and second adsorber bed 14 may contain an adsorbent material 34. Adsorbent material 34 may have an affinity to impurities, for example, water, heavy hydrocarbons, light hydrocarbons, $CO_2$, CO, and nitrogen, such that they are selectively adsorbed on the surface of adsorbent material 34. As a non-limiting example, adsorbent material 34 may comprise one or more of a desiccant, such as silica, carbon or silicon nanoparticles, surface treated particles, aluminum oxide, and zeolites.

Due to the pressure of feed gas 24, when first adsorber bed 12 is operating in adsorption mode 200, adsorbent material 34 in first adsorber bed 12 may adsorb a fraction of the impurities from feed gas 24, such that feed gas 24 becomes higher purity. This higher purity gas may be represented as a product gas 36. Product gas 36 may exit through first product port 30, at or near the top of first adsorber bed 12, when first adsorber bed 12 is operating in adsorption mode 200, and may be directed through first valve assembly 16 to a product gas storage 38. In some embodiments, product gas 36 may be directed to a distribution system or another system for further processing.

Figure 9:
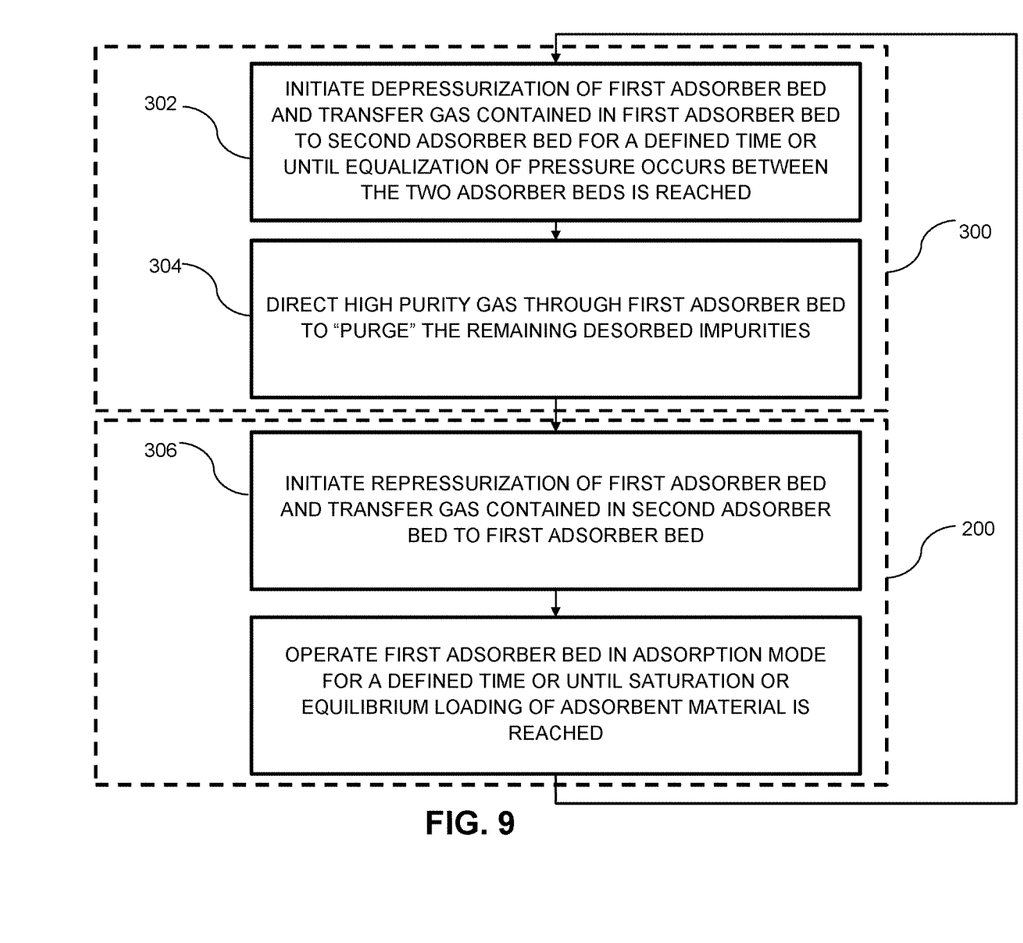
FIG. 9 is a flow diagram illustrating a method of operating a PSA system, according to either exemplary PSA system.

First adsorber bed 12 may operate in adsorption mode 200 for a defined time or until saturation or equilibrium loading of adsorbent material 34 is reached, at which time, PSA system 10 may be configured to end adsorption mode 200 for first adsorber bed 12 and initiate regeneration mode 300, as also shown in FIG. 9. PSA system 10 may be configured, such that concurrently, second adsorber bed 14 may switch from regeneration mode 300 to adsorption mode 200.

Regeneration mode 300 for first adsorber bed 12 may comprise, for example, lowering the pressure within the bed resulting in a respective decrease in equilibrium loading causing the impurities adsorbed on adsorbent material 34 to desorb, thereby regenerating adsorbent material 34. The desorbed impurities may then be evacuated from first adsorber bed 12.

Figure 2:
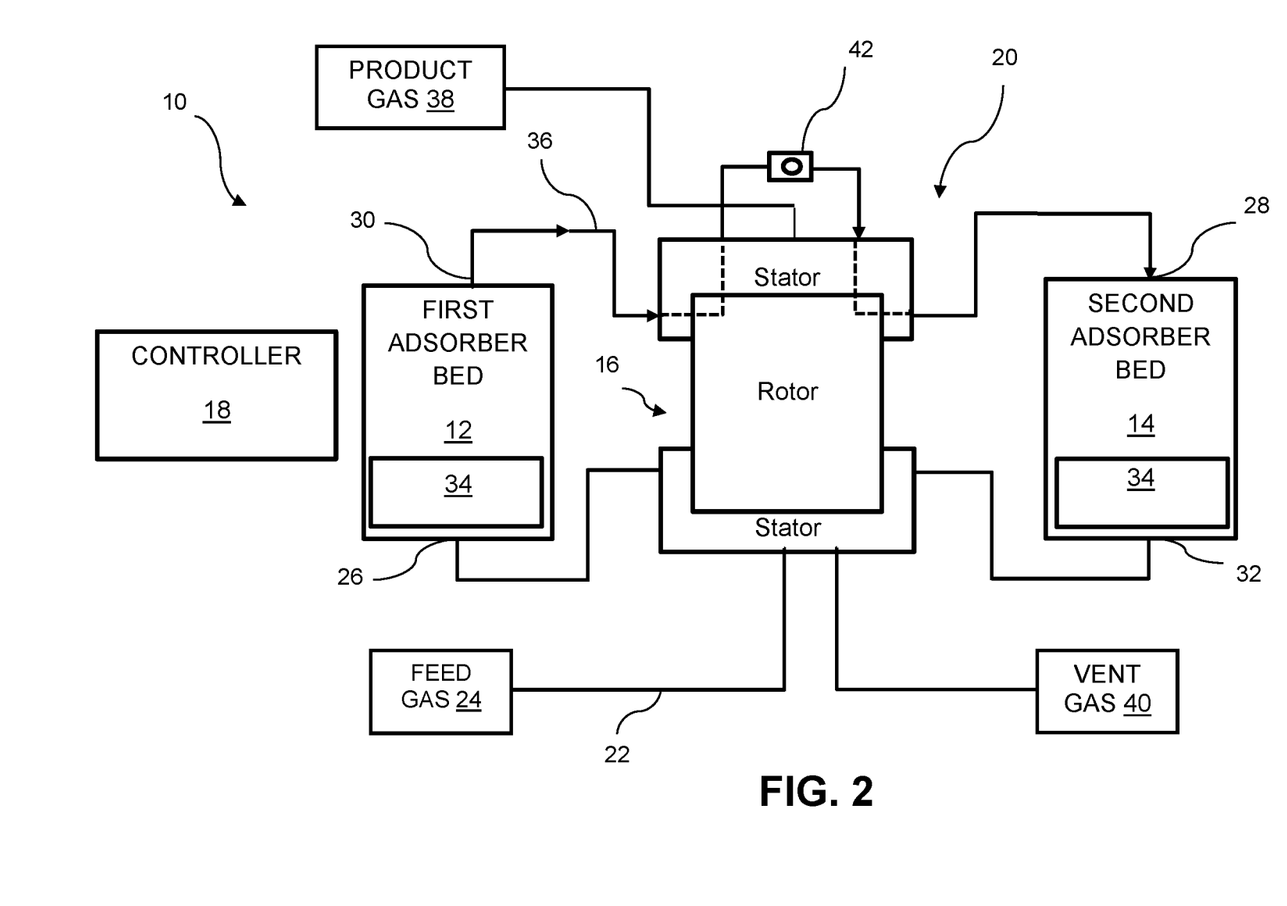
FIG. 2 is a flow schematic of the exemplary PSA system of FIG. 1, wherein the PSA is configured for a pressure equalization step between the first bed and the second bed in which the first bed is being depressurized.

Regeneration mode 300 may comprise of at least a pressure equalization step 302 and a purge step 304. As shown in FIG. 2 and FIG. 9, PSA system 10 may be configured such that pressure equalization step 302 may comprise transferring gas (e.g., residual feed gas 24 or product gas 36) contained in first adsorber bed 12, which may be depressurizing following adsorption mode 200 operation, to second adsorber bed 14, which may be undergoing repressurization as part of initiating adsorption mode 200 following regeneration mode 300. Depressurization of first adsorber bed 12 during pressure equalization step 302 may be, for example, in the co-current direction from bottom to top (i.e., from first feed port 26 to first product port 30). During pressure equalization step 302, feed gas 24 still stored in the void space of adsorbent material 34 may flow through first valve assembly 16 into second adsorber bed 14 to help pressurize the adsorber bed. Pressure equalization step 302 may run for a set duration and/or may run until equalization of pressure occurs between the two adsorber beds (e.g., first adsorber bed 12 and second adsorber bed 14). Pressure equalization step 302 may be configured to help minimize feed gas 24 loss and increase a recovery rate for PSA system 10.

Following pressure equalization step 302, PSA system 10 may proceed to purge step 304. In some embodiments, purge step 304 may be represented as an exhaust or evacuation step. In preparation for or as part of purge step 304, the adsorber bed undergoing regeneration may release the remaining pressure, for example, by exhausting to atmospheric pressure via a connection to first feed port 26 (not shown). Releasing the pressure in first adsorber bed 12 may allow impurities adsorbed by adsorbent material 34 to be desorbed. The pressure may be released in the counter-current direction (i.e., from first product port 30 to first feed port 26), thereby preventing break-through of impurities at the top of first adsorber bed 12. The impurities may flow out of first feed port 26 via, for example, first valve assembly 16 and vent gas outlet 40 when the rotor and stator are properly aligned to connect first feed port 26 and vent gas outlet 40. Vent gas outlet 40 may direct waste gas to, for example, disposal, storage, or for further processing. For example, the impurities may flow to a tail gas system (not shown).

Figure 3:
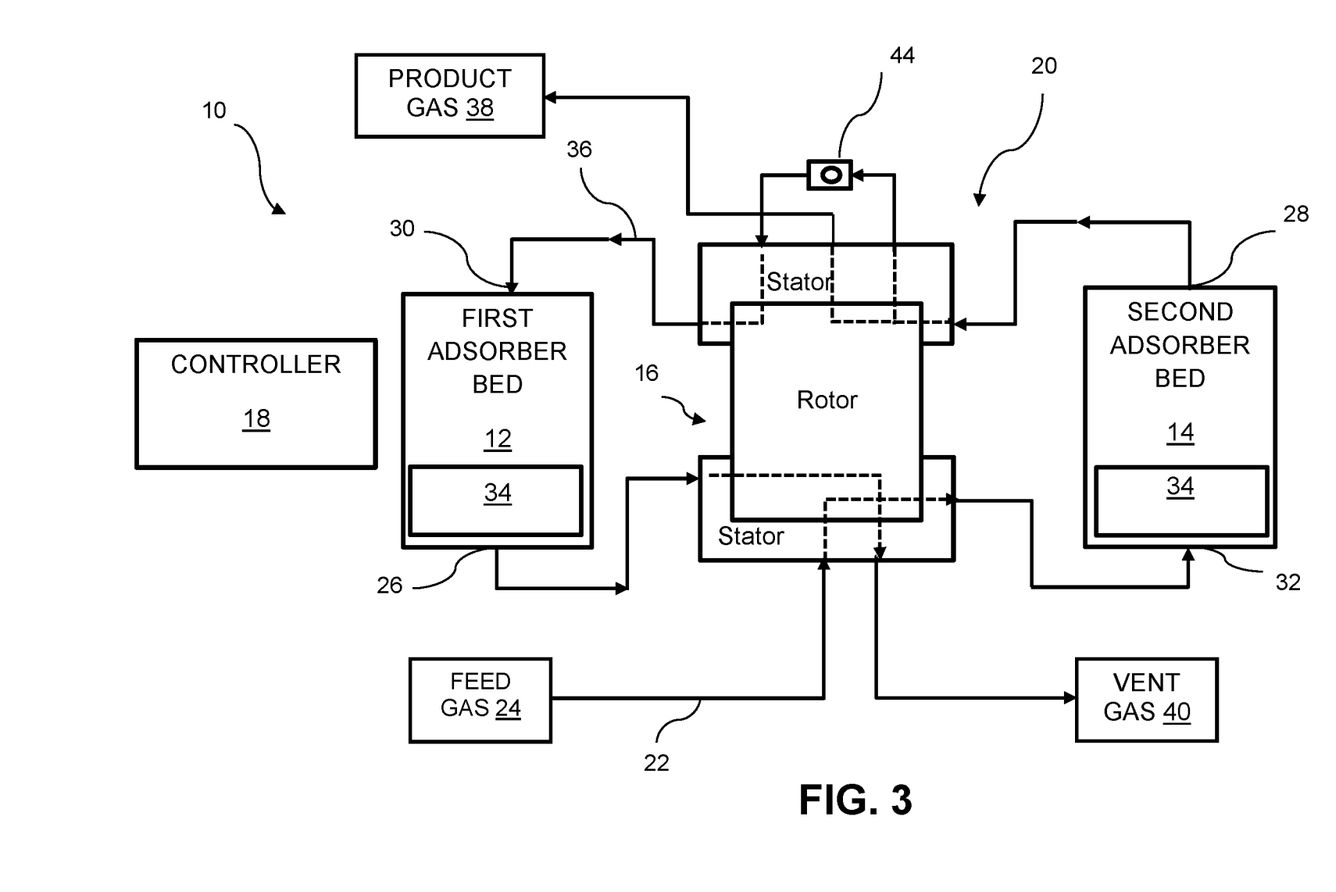
FIG. 3 is a flow schematic of the exemplary PSA system of FIG. 1, wherein the first bed of PSA system is configured for a purge step.

Following the release of pressure from first adsorber bed 12, PSA system 10 may be configured to proceed with purge step 304. As shown in FIG. 3 and FIG. 9, purge step 304 may include directing (e.g., counter-current) high purity gas through first adsorber bed 12 in order to "purge" the remaining desorbed impurities from adsorbent material 34 and first adsorber bed 12. By removing the remaining impurities, the residual loading on adsorbent material 34 may be reduced to a minimum, thereby achieving higher efficiency. As shown in FIG. 3, PSA system 10 may be configured such that the high purity gas used for purge step 304 may be product gas 36 being produced by PSA system 10. For example, when first adsorber bed 12 is performing purge step 304, simultaneously, second adsorber bed 14 may be operating in adsorption mode 200 producing product gas 36. Therefore, product gas 36 being produced by second adsorber bed 14 may be supplied to first adsorber bed 12 at first product port 30. Product gas 36 may be supplied to first adsorber bed 12 from second adsorber bed 14 via first valve assembly 16 and the corresponding network of piping.

In some embodiments, the high purity gas utilized for purge step 304 may be from another source. For example, product gas 36 may be supplied by product gas storage 38. In another example, an alternative gas besides product gas 36 may be utilized for purge step 304 and may be routed through first valve assembly 16 to first product port 30.

Figure 4:
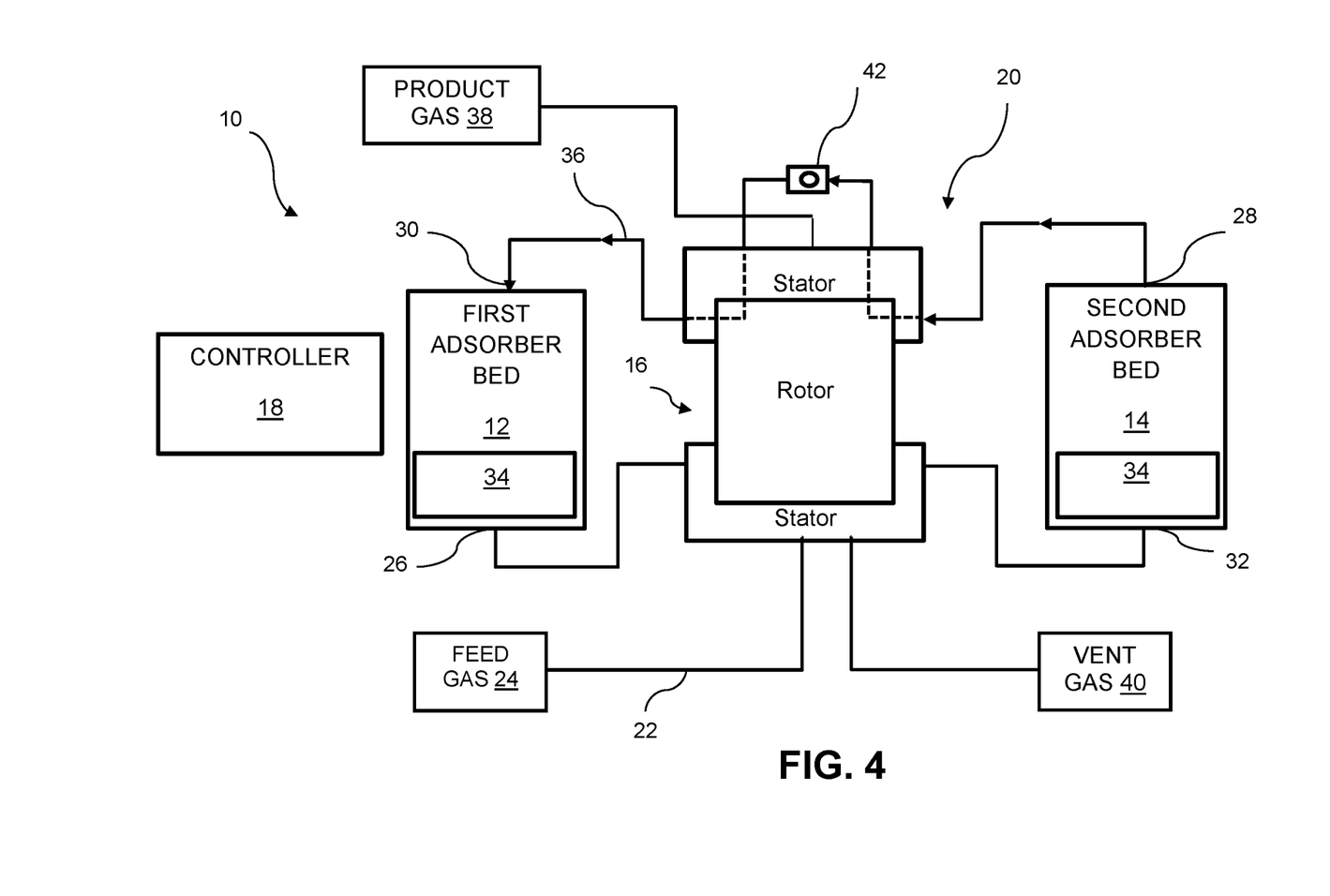
FIG. 4 is a flow schematic of the exemplary PSA system of FIG. 1, wherein the PSA is configured for a pressure equalization step between the first bed and the second bed in which the first bed is being pressurized.

Following completion of purge step 304 on first adsorber bed 12, PSA system 10 may be configured to transition first adsorber bed 12 from regeneration mode 300 to adsorption mode 200 and initiate repressurization of first adsorber bed 12. As shown in FIG. 4 and FIG. 9, PSA system 10 may be configured such that repressurization step 306 of first adsorber bed 12 may occur concurrently with pressure equalization of second adsorber bed 14. Therefore, first adsorber bed 12 may be repressurized by directing gas contained in second adsorber bed 14 to first adsorber bed 12. Final pressure for adsorption mode 200 may not be reached by pressure equalization alone, therefore repressurization to adsorption mode 200 pressures may be reached by introduction of feed gas 24 to first adsorber bed 12.

It is contemplated that repressurization step 306 could be considered part of regeneration mode 300 although, as described herein, it is described—as part of adsorption mode 200. It is also contemplated that adsorption mode 200 and regeneration mode 300 may include additional steps or sub-steps not discussed herein.

As described herein, PSA system 10 may be configured such that first adsorber bed 12 and second adsorber bed 14 may switch back and forth in coordinated operation between adsorption mode 200 and regeneration mode 300, thereby enabling nearly continuous production of product gas 36. The coordinated operation may be controlled by controller 18 and carried out by adjusting first valve assembly 16, among other components. In some embodiments, PSA system 10 may have additional adsorber beds (e.g., a third, fourth, fifth, sixth, or more) with corresponding valve and piping connections allowing for coordinated operation enabling continuous production from at least one or more of the adsorber beds.

Figure 5:
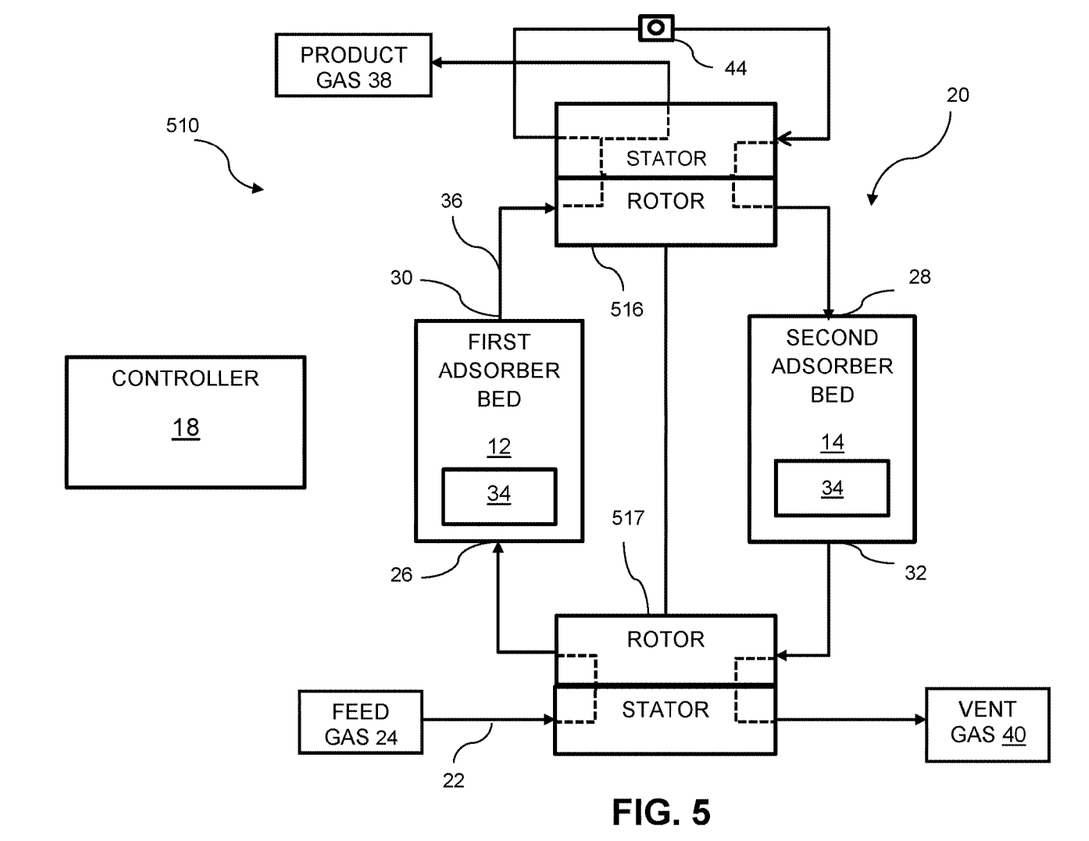
FIG. 5 is a flow schematic of another exemplary PSA system with PSA beds that rotate with the rotors of the valves, wherein a first adsorber bed is configured for adsorption mode and a second adsorber bed is configured for regeneration mode.

FIG. 5 shows a second embodiment of a pressure swing adsorption system (PSAs) 510, according to an exemplary embodiment. PSA system 510 may be similar to PSA system 10, except that the system may include a first valve 516 and a second valve 517, wherein first valve 516 and second valve 517 perform the function of first valve assembly 16 of PSA system 10. First valve 516 and second valve 517 may be, for example, rotary valves as described herein. As shown in FIG. 5, first valve 516 and second valve 517 may be interconnected by linkage configured to coordinate operation of the rotors. In some other embodiments, first valve assembly 16, first valve 516, and second valve 517 may be replaced with a network of actuated isolation or control valves configured to direct the flow of gas to and from first adsorber bed 12 and second adsorber bed 14. In some embodiments, the beds (i.e., first absorber bed 12 and second absorber bed 14) may be configured to rotate with the rotors of valves 516 and 517.

Figure 6:
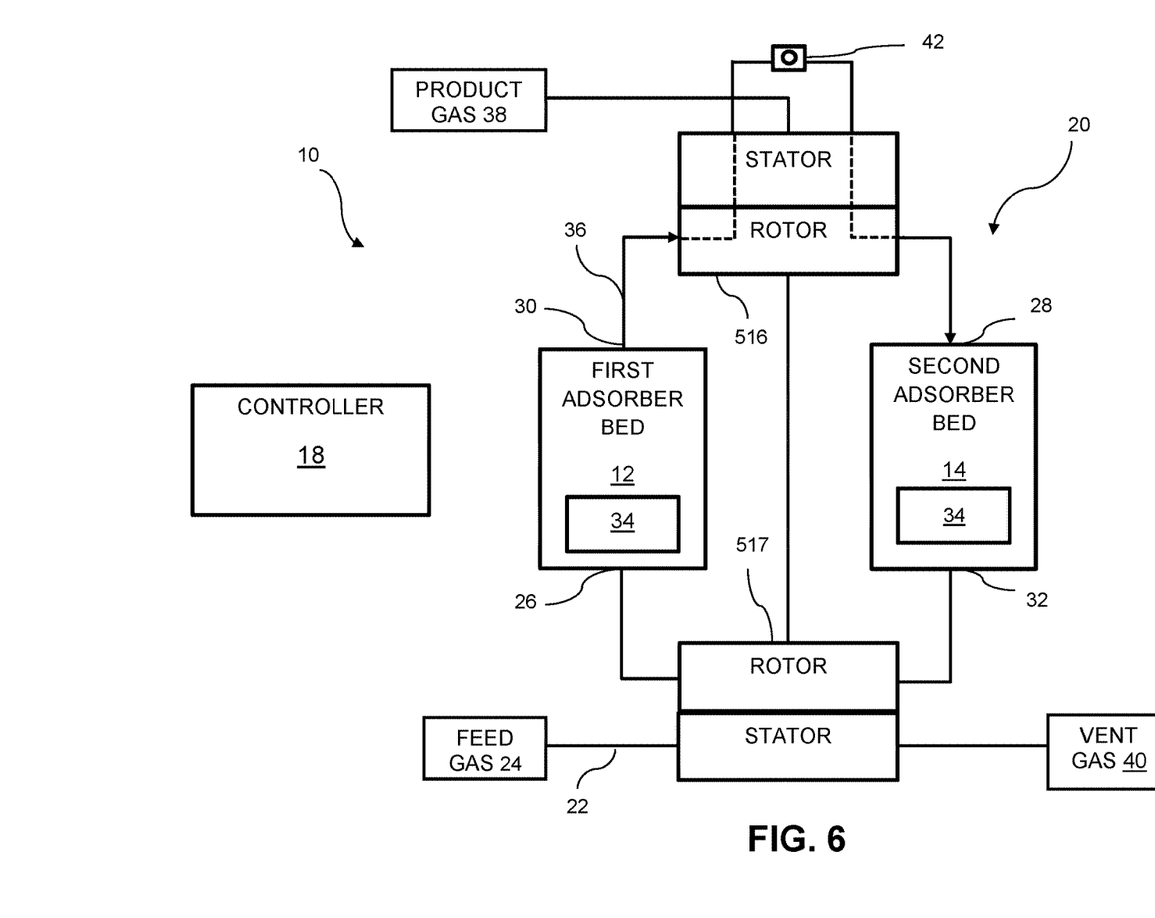
FIG. 6 is a flow schematic of the exemplary PSA system of FIG. 5, wherein the PSA is configured for a pressure equalization step between the first bed and the second bed in which the first bed is being depressurized.
Figure 7:
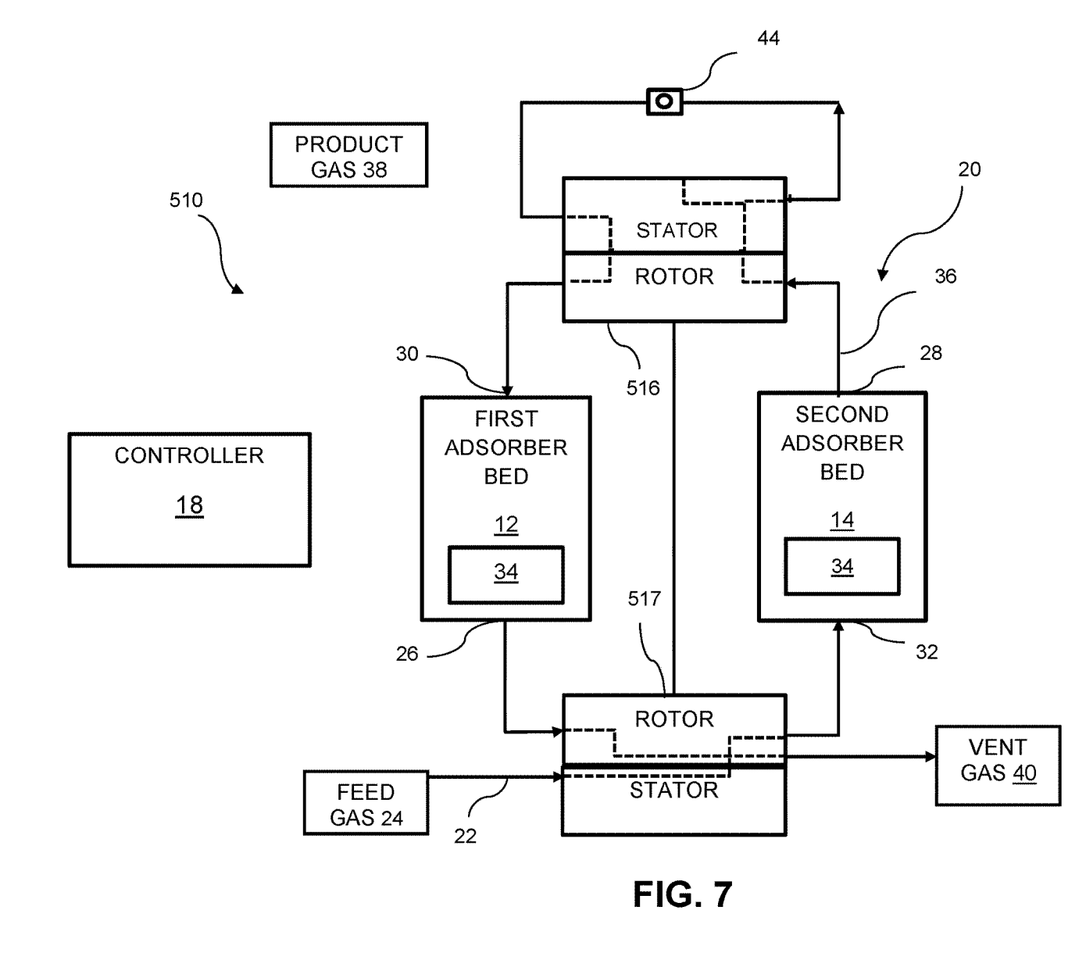
FIG. 7 is a flow schematic of the exemplary PSA system of FIG. 5, wherein the first bed of PSA system is configured for a purge step.
Figure 8:
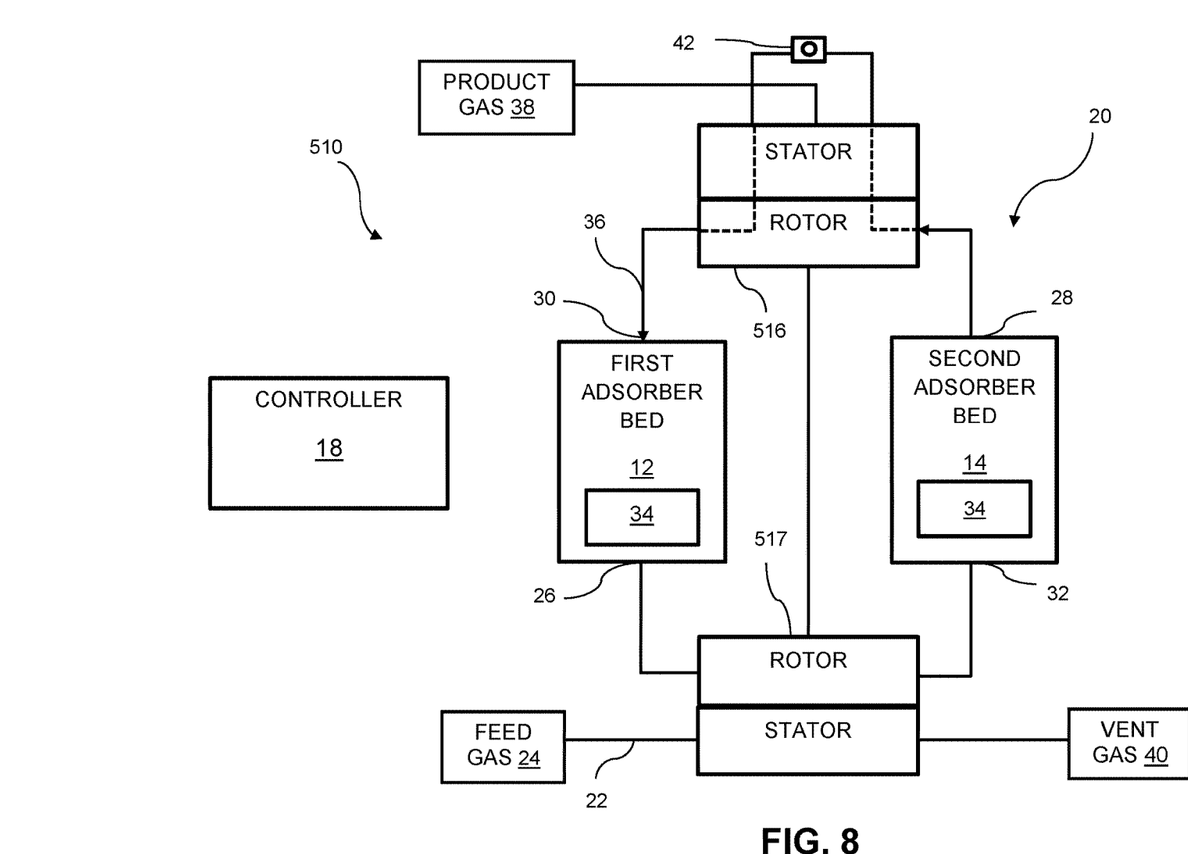
FIG. 8 is a flow schematic of the exemplary PSA system of FIG. 5, wherein the PSA is configured for a pressure equalization step between the first bed and the second bed in which the first bed is being pressurized.

As shown in FIG. 6 and FIG. 9, PSA system 510 similar to PSA system 10, may be configured such that pressure equalization step 302 may comprise transferring gas (e.g., residual feed gas 24 or product gas 36) contained in first adsorber bed 12, which may be depressurizing following adsorption mode 200 operation, to second adsorber bed 14, which may be undergoing repressurization as part of initiating adsorption mode 200 following regeneration mode 300. Following pressure equalization step 302, PSA system 10 may proceed to purge step 304. As shown in FIG. 7, purge step 304 for PSA system 510, similar to PSA system 10, may include directing (e.g., counter-current) high purity gas through first adsorber bed 12 in order to "purge" the remaining desorbed impurities from adsorbent material 34 and first adsorber bed 12. As shown in FIG. 7, PSA system 510 may be configured such that the high purity gas used for purge step 304 may be product gas 36 being produced by PSA system 510. Following completion of purge step 304 on first adsorber bed 12, PSA system 510 may be configured to transition first adsorber bed 12 from regeneration mode 300 to adsorption mode 200 and initiate repressurization step 306 of first adsorber bed 12. As shown in FIG. 8, PSA system 10 may be configured such that repressurization step 306 of first adsorber bed 12 may occur concurrently with pressure equalization of second adsorber bed 14. Therefore, first adsorber bed 12 may be repressurized by directing gas contained in second adsorber bed 14 to first adsorber bed 12.

As discussed herein, in traditional PSA systems, variable flow resistance valves are often used to adjust the flow rate of gas during pressure equalization step 302. The flow resistance valves may be adjusted such that under-equalization (i.e., meaning the beds do not reach the ideal final pressure) or over-equalization (i.e., meaning the equalization takes place too quickly, disrupting the distribution of gases in the adsorber bed). Adjustment and tuning of the variable flow resistance valves is often done during commissioning and could result in increased cost and increased commissioning time. In addition, the possibility of inadvertent or improper adjustment of the variable flow resistance valves after commissioning creates concern with regard to the sustainable performance of the PSA systems.

In contrast, PSA system 10 or 510 described herein, may include a first orifice 42 configured to regulate the flow of the gas between first adsorber bed 12 and second adsorber bed 14 during pressure equalization step 302, as shown in FIG. 2. First orifice 42 may have a fixed flow restriction, which may be determined pre-commissioning based on, for example, calculations performed during the system engineering stage. Utilizing first orifice 42 to regulate the flow of gas during pressure equalization step 302 may eliminate the cost and added complexity of the variable flow resistance valves often found in traditional PSA systems and may also prevent post commissioning tampering, which may affect the flow rate of gas during pressure equalization step 302. In other words, PSA system 10/510 may be configured such that the flow rate of gas transferred between first adsorber bed 12 and second adsorber bed 14 during pressure equalization step 302 is not adjustable. Furthermore, utilizing first orifice 42 increases the reproducibility of PSA systems 10/510 performance from PSA system 10/510 to PSA system 10/510.

The positioning of first orifice 42 in PSA system 10/510 may vary. For example, first orifice 42 may be incorporated into first valve assembly 16 or first valve 516 such that when first product port 30 and second feed port 28 or second product port 32 and first feed port 26 are in communication via first valve assembly 16 or first valve 516, flow is directed through a passage of first valve assembly 16 or first valve 516 housing first orifice 42. In some embodiments, first orifice 42 may be positioned in a line between first adsorber bed 12 and first valve assembly 16 or first valve 516. In some embodiments, first orifice 42 may be positioned in a line between second adsorber bed 14 and first valve assembly 16 or first valve 516.

As discussed herein, in traditional PSA systems, variable flow resistance valves are often used to adjust the flow rate of gas during purge step 304. The variable flow resistance valves may be adjusted such that a proper flow rate of product gas 36 may be delivered to the adsorber bed undergoing a purge. The use of variable flow resistance valves for controlling purge flow has the same drawbacks and disadvantages as using flow resistance valves for controlling pressure equalization flow. For example, adjustment and tuning of the variable flow resistance valves is often done during commissioning and may result in increased cost and increased commissioning time. In addition, the possibility of inadvertent or improper adjustment of the variable flow resistance valves after commissioning creates concern with regard to the sustainable performance of the PSA systems.

In contrast, PSA system 10 or 510 described herein, may also include a second orifice 44 configured to regulate a flow rate of product gas 36 during purge step 304. Second orifice 44 may have a fixed flow restriction, which may be determined pre-commissioning based on, for example, calculations performed during the system engineering stage. Utilizing second orifice 44 to regulate the flow rate of product gas 36 during purge step 304 may eliminate the cost and added complexity of the variable flow resistance valves and may prevent post commissioning tampering. In other words, PSA system 10/510 may be configured such that the flow rate of product gas 36 transferred between first adsorber bed 12 and second adsorber bed 14 during purge step 304 is not adjustable. Furthermore, utilizing second orifice 44 may increase the reproducibility of PSA systems 10/510 performance from PSA system 10/510 to PSA system 10/510. In some embodiments, first orifice 42 and second orifice 44 may be the same orifice and may be used to regulate both equalization and purge.

Second orifice 44 may be configured to regulate the flow rate of product gas 36 between first adsorber bed 12 and second adsorber bed 14, such that excessive product gas 36 is not purged through the regenerating bed. Using excessive product gas 36 for purging may be a waste, reducing the recovery rate of PSA system 10/510 and in some cases, may cause contamination of first adsorber bed 12 and/or second adsorber bed 14.

The positioning of second orifice 44 in PSA system 10/510 may vary. For example, as shown in FIGS. 1-8, second orifice 44 may be incorporated into first valve assembly 16 or first valve 516, such that when first product port 30 and second product port 32 are in communication via first valve assembly 16 or first valve 516, flow is directed through a passage of first valve assembly 16 or first valve 516 housing second orifice 44. In other embodiments, second orifice 44 may be positioned in a line of the network of piping 20, between first adsorber bed 12 and first valve assembly 16 or first valve 516, or second orifice 44 may be positioned in a line between second adsorber bed 14 and first valve assembly 16 or first valve 516. In some embodiments, second orifice 44 like first orifice 42, although shown external to first valve assembly 16 in FIGS. 1-8, may be located internal to first valve assembly 16.

In some embodiment, first orifice 42 and second orifice 44 may be the same orifice in size, which may be configured to regulate flow during pressure equalization step 302 and purge step 304 for PSA system 10/510.

As described herein, PSA system 10/510 may utilize a first orifice 42 and/or a second orifice 44 to regulate flow during pressure equalization step 302 and/or purge step 304. By doing so PSA system 10/510 may (1) decrease PSA system commissioning time; (2) increase PSA system performance consistency; (3) prevent unfavorable or tampering with PSA system valve adjustments; and (4) be different than previous PSA system because it may be on a fixed rotary seal.

It will be apparent to those skilled in the art that various modifications and variations can be made to the disclosed system and method. For example, the systems and methods described herein may be utilized with pressure swing adsorption systems having any number of adsorber beds. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A pressure swing adsorption system for purifying a feed gas, comprising:
   a first adsorber bed and a second adsorber bed, each having a feed port, a product port, and an adsorbent material designed to adsorb one or more impurities from the feed gas to produce a product gas;
   a network of piping configured to:
     direct the feed gas to the feed ports of the adsorber beds;
     direct the product gas to and from the product ports of the adsorber beds; and
     transfer gas between the first adsorber bed and the second adsorber bed during a pressure equalization step and a purge step;
   a first rotary valve assembly configured to direct flow of the feed gas and the product gas through the network of piping;
   a first orifice configured to regulate a flow rate of gas between the first adsorber bed and the second adsorber bed during the pressure equalization step; and
   a second orifice configured to regulate a flow rate of all gas that flows between the first adsorber bed and the second adsorber bed during the purge step.

2. The pressure swing adsorption system of claim 1, wherein the first orifice is configured to be a fixed flow restriction.

3. The pressure swing adsorption system of claim 1, wherein a hole size of the first orifice is determined pre-commissioning based on system engineering design calculations.

4. The pressure swing adsorption system of claim 1, wherein the second orifice is configured to be a fixed flow restriction.

5. The pressure swing adsorption system of claim 4, wherein the first orifice is integrated into the first rotary valve.

6. The pressure swing adsorption system of claim 1, wherein the beds are stationary.

7. The pressure swing adsorption system of claim 1, wherein the flow rate of gas between the first adsorber and the second adsorber during at least one of the equalization step and the purge step is not adjustable.

8. The pressure swing adsorption system of claim 1, further including a controller in communication with the first rotary valve and configured to adjust the position of the first rotary valve.

9. A pressure swing adsorption system for purifying a feed gas, comprising:
   a first adsorber bed and a second adsorber bed, each having a feed port, a product port, and an adsorbent material designed to adsorb one or more impurities from the feed gas to produce a product gas;
   a network of piping configured to:
     direct the feed gas to the feed ports of the adsorber beds;
     direct the product gas to and from the product ports of the adsorber beds; and
     transfer gas between the first adsorber bed and the second adsorber bed during an equalization step and a purge step;
   a first rotary valve configured to direct flow of the feed gas flow and the product gas flow through the network of piping;
   a second rotary valve configured to direct flow of the feed gas flow and the product gas flow through the network of piping;
   a first orifice configured to regulate a flow rate of the gas between the first adsorber bed and the second adsorber bed during the equalization step; and
   a second orifice configured to regulate a flow rate of all the gas that flows between the first adsorber bed and the second adsorber bed during the purge step.

10. The pressure swing adsorption system of claim 9, wherein the first adsorber bed and the second absorber bed rotate with the rotors of the first rotary valve and the second rotary valve.

11. The system of claim 9, further including controlling the first and second rotary valves by a controller and adjusting the position of the first and second rotary valves by a controller.

12. The system of claim 9, wherein the first orifice is integrated into a passage of at least one of the first rotary valve and the second rotary valve.

13. A method of operating a pressure swing adsorption system for purifying a feed gas flow, having a first adsorber bed and a second adsorber bed, comprising:
   operating at least one of the first adsorber bed and the second adsorber bed in an adsorption mode;
   operating at least one of the first adsorber bed and the second adsorber bed in a regeneration mode;
   transferring a gas between the first adsorber bed and the second adsorber bed during an equalization step, wherein a flow rate of the gas is regulated via a first orifice; and
   transferring a product gas between the first adsorber bed and the second adsorber bed during a purge step, wherein a flow rate of all the product gas is regulated via a second orifice.

14. The method of claim 13, wherein the flow rate of the gas transferred between the first adsorber bed and the second adsorber bed during the equalization step is not adjustable.

15. The method of claim 13, wherein the flow rate of the product gas directed to at least one of the first adsorber bed and the second adsorber bed during the purge step is not adjustable.

16. The method of claim 13, wherein the feed gas is hydrogen containing impurities.

* * * * *